United States Patent [19]
Kvalheim

[11] Patent Number: 5,331,732
[45] Date of Patent: * Jul. 26, 1994

[54] HINGE APPLICATOR WITH GANG SCREWDRIVING UNIT

[75] Inventor: Andrew M. Kvalheim, Petaluma, Calif.

[73] Assignee: Kval, Inc., Petaluma, Calif.

[*] Notice: The portion of the term of this patent subsequent to Jun. 29, 2010 has been disclaimed.

[21] Appl. No.: 45,332

[22] Filed: Apr. 8, 1993

Related U.S. Application Data

[63] Continuation-in-part of Ser. No. 922,353, Jul. 29, 1992, Pat. No. 5,222,290, which is a continuation of Ser. No. 712,979, Jun. 10, 1991, abandoned.

[51] Int. Cl.$^5$ .................................................. B23P 21/00
[52] U.S. Cl. ..................................... 29/787; 29/798; 29/809; 269/905
[58] Field of Search ........................ 29/798, 238, 281.1, 29/431, 771, 787, 809, 810, 813, 897.3, 434, 11; 269/905

[56] References Cited

U.S. PATENT DOCUMENTS

| | | |
|---|---|---|
| 3,339,601 | 9/1967 | Christman et al. ................. 144/2 R |
| 3,772,757 | 11/1973 | Goldstein . |
| 3,889,343 | 6/1975 | Miller et al. . |
| 3,979,817 | 9/1976 | Cheak . |
| 4,100,661 | 7/1978 | Cheak . |
| 4,782,588 | 11/1988 | Jangaard . |
| 4,785,531 | 11/1988 | Roy et al. ............................. 29/798 |
| 4,837,916 | 6/1989 | Jangaard . |
| 4,839,957 | 6/1989 | Jangaard . |
| 4,936,497 | 6/1990 | Ordelt ................................. 29/810 |
| 5,222,290 | 6/1993 | Kvalheim ........................... 29/787 |

Primary Examiner—Mark Rosenbaum
Assistant Examiner—David P. Bryant
Attorney, Agent, or Firm—Corwin R. Horton

[57] ABSTRACT

A machine for attaching hinges to a door having a carriage movable and longtitudinally positionable along a door edge into which the following elements are integrated:

1. A receiving block for receiving a hinge and screws and positioning them for application of the hinge to the door edge. The block contains apertures for receiving the screws and, subsequently, screw bits for driving the screws through the block. The block is movable from a hinge and screw receiving position to a hinge applying position.
2. A hinge magazine for individually feeding hinges to the hinge block.
3. A screw feeder for feeding screws individually to the hinge block.
4. A screwdriver unit having individually operated screwdrivers each positioned to have its bit received by an aperture in the receiving block and each having an air motor for rotating its screw bit and an air piston for independently moving its screw bit forward to drive a screw. The unit is movable from a retracted position when the block is receiving a hinge and screws, to an engaged position with the screw bits engaged in the apertures of the receiving block, when the receiving block is in position for application of the hinge.

9 Claims, 16 Drawing Sheets

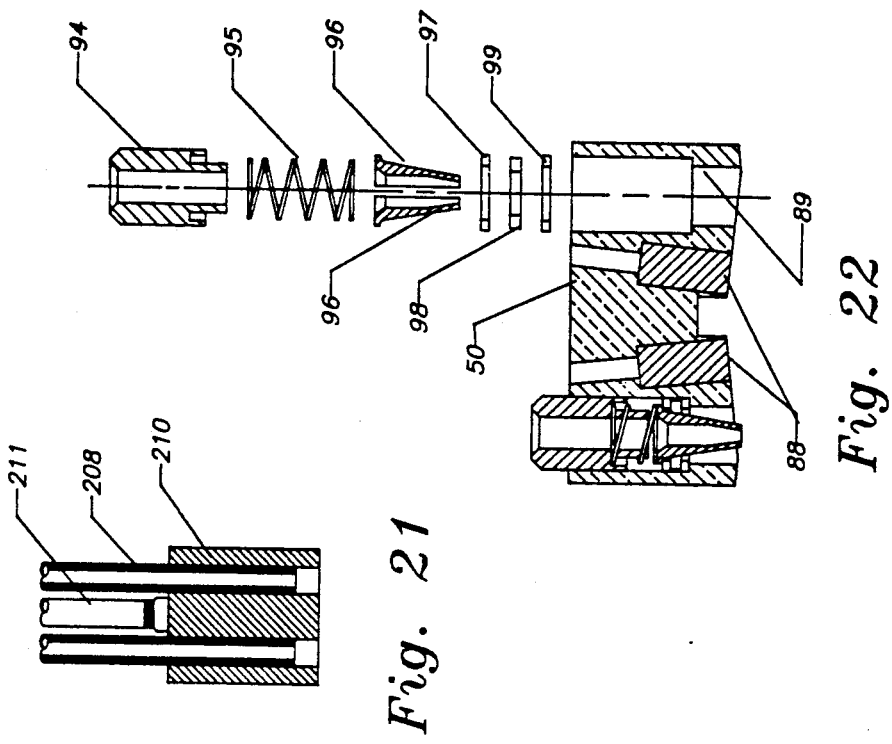
Fig. 22
Fig. 21
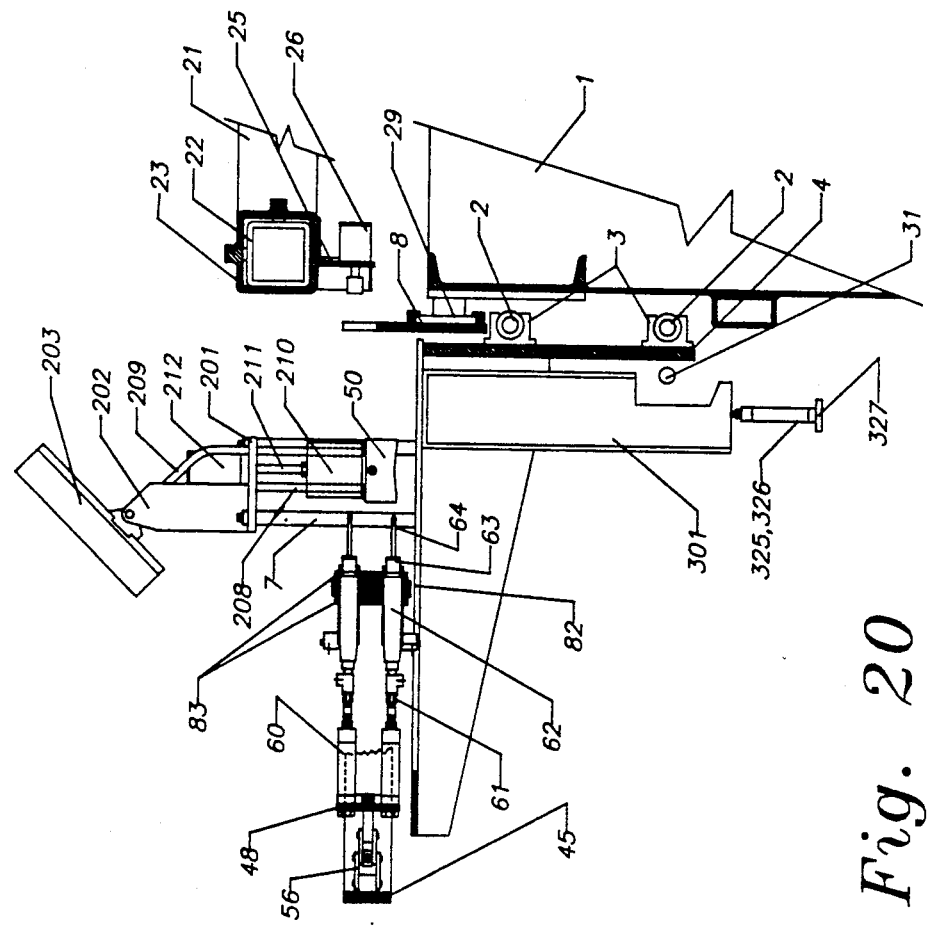
Fig. 20

Fig. 28
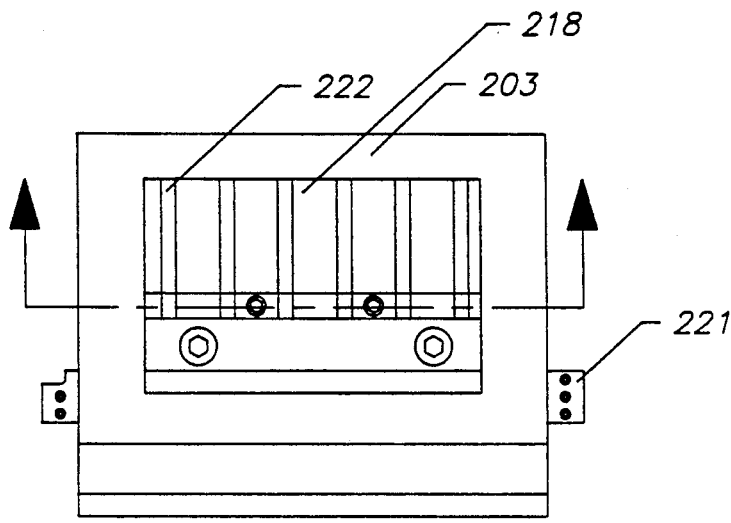
Fig. 29A    Fig. 30A    Fig. 31A
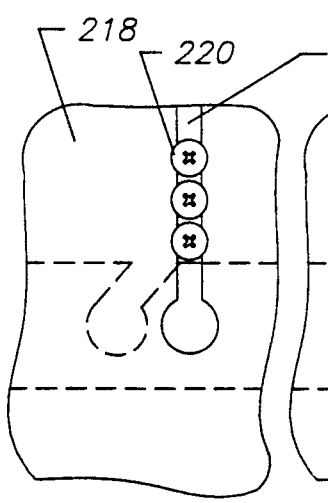 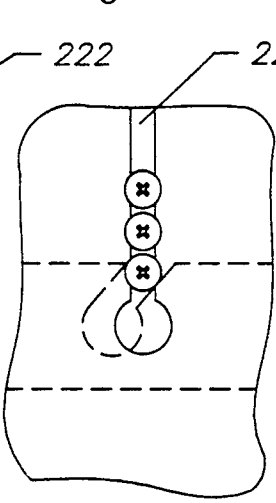 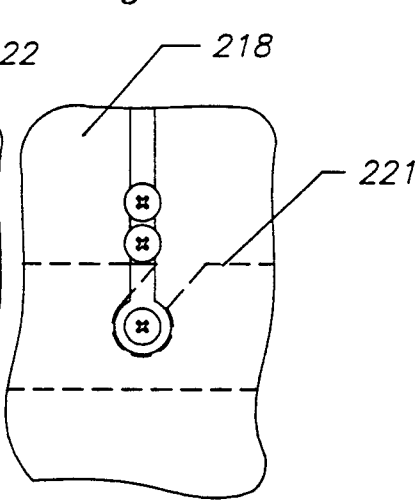
Fig. 29B    Fig. 30B    Fig. 31B
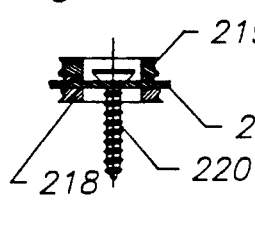 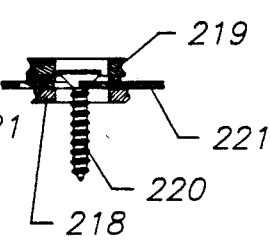 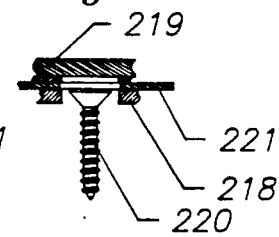

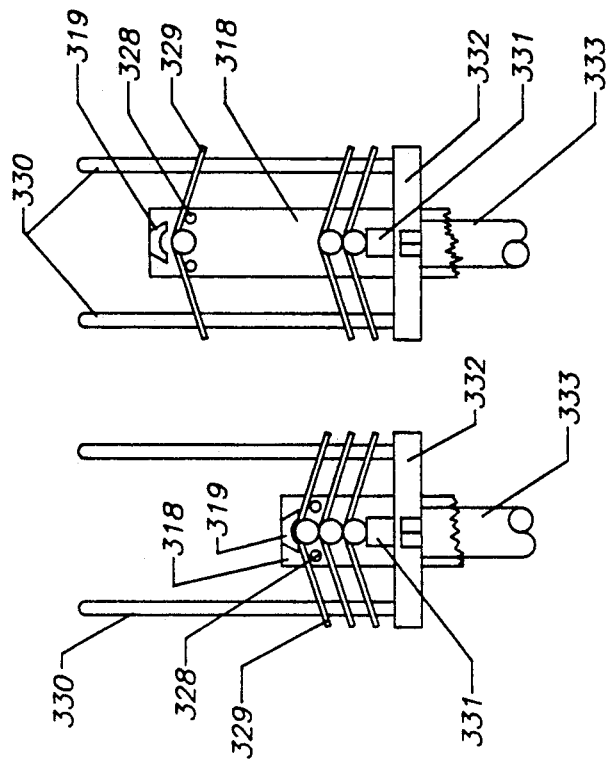
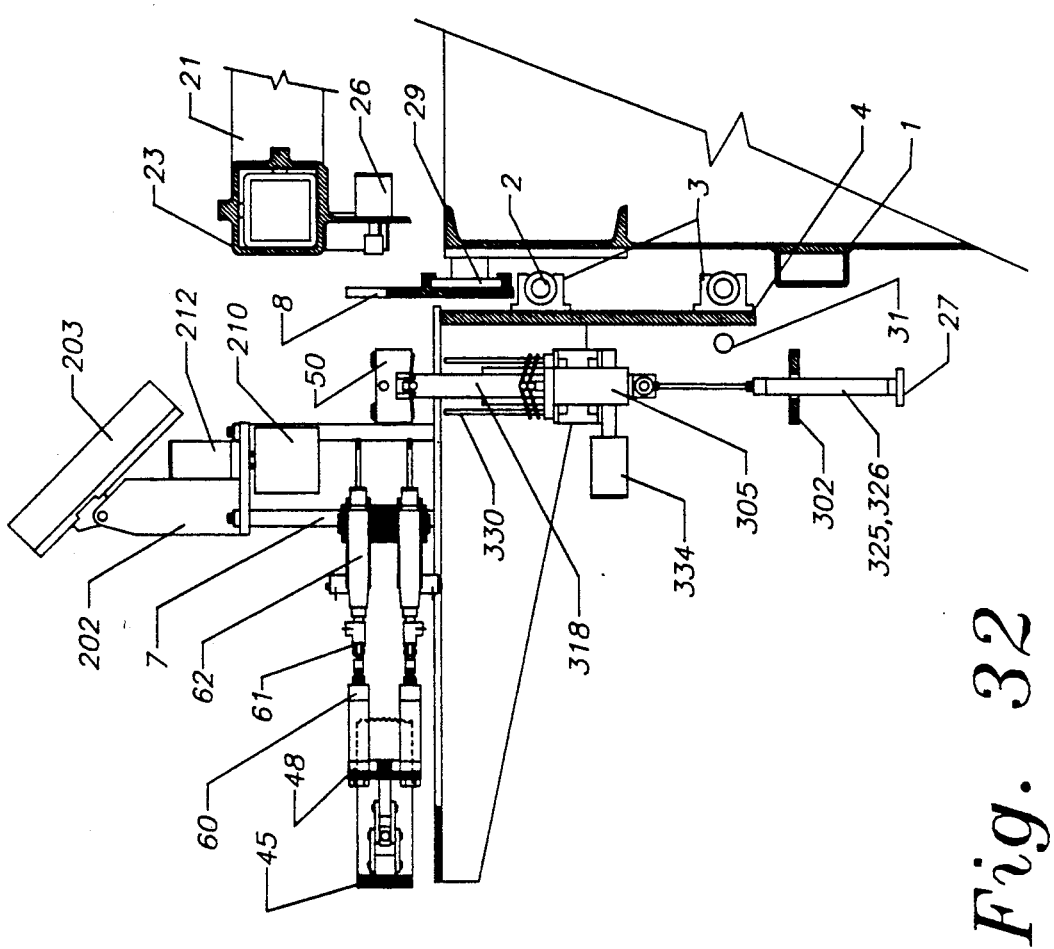
Fig. 34
Fig. 33
Fig. 32

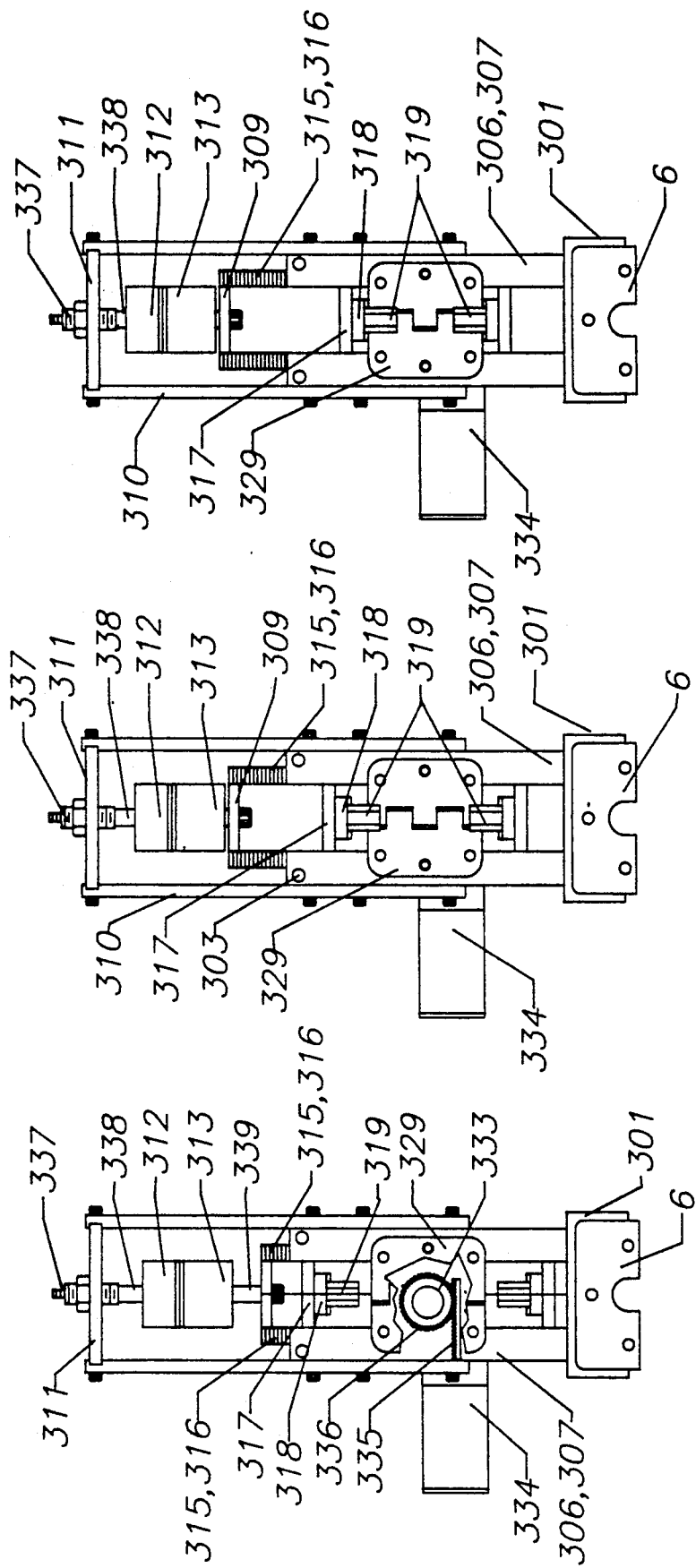

HINGE APPLICATOR WITH GANG SCREWDRIVING UNIT

This is a continuation-in-part of copending application Ser. No. 07/922,353, filed on Jul. 29, 1992 and now issued as U.S. Pat. No. 5,222,290, which is, in turn, a continuation of application Ser. No. 712,979, filed Jun. 10, 1991, now abandoned.

FIELD OF THE INVENTION

This invention relates to automatically attaching hinges to the door edges and jamb face at predetermined locations in order to facilitate the production of pre-hung doors. More specifically the invention relates to apparatus that integrates the elements of automatic hinge feeding, automatic screw feeding, and automatic screwdriving and in addition integrates the function of automatically locating the hinges in correct position along the length of the door and jamb.

BACKGROUND OF THE INVENTION AND PRIOR ART

Originally carpenters hung doors at the work site but over the past few decades there have been various machines developed to facilitate the machining and assembly of pre-hung doors. This function is now performed generally by Millwork and Specialty firms. The process includes preparing the door, jamb and other members by routing or mortising for hinges, drilling generally for a cylindrical type lock, attaching the hinges with screws, and nailing up the frame around the door. My invention relates specifically only to the special aspect of attaching the hinges. This has been a tedious and time consuming job if done manually. My invention claims a higher degree of automation than previously attained especially relating to hinge feeding with some notable improvements in other areas. Various considerations have been adopted relating to hinge application, the most notable and closely related known to the inventor is as follows:

U.S. Pat. No. 4,100,661 to Edward G. Cheak, provides for machining pre-hung door members, pre-drilling screw holes and attaching hinges without the use of automatic screw or hinge feeding.

U.S. Pat. No. 3,979,817 to Edward G. Cheak method claims of Cheak patent.

U.S. Pat. Nos. 4,837,916, 4,839,957, and 4,782,588 to Erling S. Jangaard describes a mechanism for automatic screw feeding, manual hinge feeding, and power means to drive screws.

All of the foregoing patents and U.S. Pat. No. 3,889,343 to Miller et al. and U.S. Pat. No. 3,772,757 to Goldstein as well, each describe hinge applicators which utilize a gang screwdriving unit for simultaneously driving the screws into the hinge. The screwdrivers are powered for rotation by a gearing system that uses a common power source or, in the case of U.S. Pat. No. 3,889,343, by an independent fluid motors for each screwdriver. The screwdrivers are fixed to a carriage which is first moved from a retracted position to a forward position to engage the screws to be driven. To simultaneously drive the screws the carriage is then urged farther forward as each screwdriver is rotated.

U.S. Pat. No. 3,339,601 to Carl E. Christman and Thomas S. Ferguson discloses an automatic work bench adapted for applying door knobs as well as hinges. The hinge attaching features are not separately claimed.

U.S. Pat. No. 4,785,531 to Armand E. Roy and Leo T. Roy demonstrates the application and placement of an easel type hinge in a specific manner.

U.S. Pat. No. 3,071,291 to Charles Alfred Davis applies to nailing machines for automatic feeding of nails rather than screws. It utilizes a separate oscillating hopper box to shake screws down a fixed slide assembly.

U.S. Pat. No. 2,943,764 to Alfred H. Haberstump uses an oscillating hopper box also with a fixed screw slide escapement assembly.

Although there are a number of patents relating to the general area of machine construction for the purpose of producing pre-hung doors, my invention has many novel features and none of these patents disclose nor claim an automatic hinge handling of positioning device such as found in my invention.

SUMMARY OF THE INVENTION

The object of my invention is to supply the pre-hung door industry with a machine to eliminate the tedious and repetitive job of handling screws and hinges and driving them in manually. Another object is to give the industry greater technology and labor saving mechanisms to increase productivity in a competitive environment.

Specifically, my invention relates to the automatic application of butt hinges to door edges and jamb faces. This invention has several notable and novel features not found in other machines. After the pre-mortised door and jamb are clamped in place, a single, movable main carriage assembly locates automatically and accurately at repeatable intervals along the length of the door and jamb to attach hinges. After the main carriage is located in place, screws are inserted into a receiving block, now horizontally disposed, with spacement corresponding to the screw holes in butt hinges. This is accomplished in my invention by a system including single screw hopper box designed with a slide escapement in the box itself rather than mounted in a separate fixed incline unit as commonly used.

Hinges are placed in register on the screw and hinge receiving block by an apparatus utilizing a magazine of approximately 12 hinges wherein fingers lift one hinge upward and place it on the receiving block where it is held in place by magnetic or other means. The fingers extend sideways to clear the hinge and drop down to a ready position for moving up the next hinge. The screwdriving system, is mounted in a generally horizontal plane and movable toward and away from the door edge and jamb face. With the screwdriver bits retracted, the receiving block is rotated 90 degrees to a vertically disposed position, so that the hinge is in the same plane as the door edge and jamb face. Generally there are six screwdriver motors with direct drive bits. As a unit they move in close to the block to prevent screws from escaping the back side of the receiving blocks. The screwdriver carriage, with the screwdrivers in the same relative position to the block, moves in toward the door edge and jamb face and positions the hinge firmly in place in the mortised hinge pocket. Hook latches are engaged to secure the screwdriver carriage in the forward position. Screws are then driven into the hinges to hold them in place. This is done by a gang of screwdrivers, typically six, which are individually actuated, preferably by individual air cylinders, to yieldably urge their respective screw bits forward to drive their respective screws.

DESCRIPTION OF THE DRAWINGS

Further and more particular objects, of the invention, as well as explicit details of structure will be apparent by reference to the following drawings, in which:

FIG. 20 is a side view of the main carriage showing a telescopic block engaged to the screw and hinge receiving blocks for automatic transfer of screws.

FIG. 21 is a sectional view of the telescopic block mentioned previously.

FIG. 22 is a sectional view of the screw and hinge receiving block with components.

FIG. 28 is a top view of the screw box container.

FIG. 29 A&B is the start position for dropping a screw escapement bar.

FIG. 30 A&B is the start position for dropping a screw into tube with the escapement bar.

FIG. 31 A&B is the drop position for one screw and hold back position of the remaining screws in a slot.

FIG. 32 is a sectional view of the relationship of the screwdriving apparatus and the hinge placement apparatus in the hinge placement mode.

FIGS. 33 and 34 are views of the hinge magazine with the top hinge separated from the rest of the hinges.

FIG. 39 is a top view of the apparatus for hinge feeding corresponding to the side view of FIG. 35. This view also shows the gear and rack system for rotating magazine 180 degrees.

FIG. 40 is a top view corresponding to the side view shown in FIG. 36.

FIG. 41 is a top view corresponding to the side view shown in FIG. 37.

DETAILED DESCRIPTION

Figure 1:
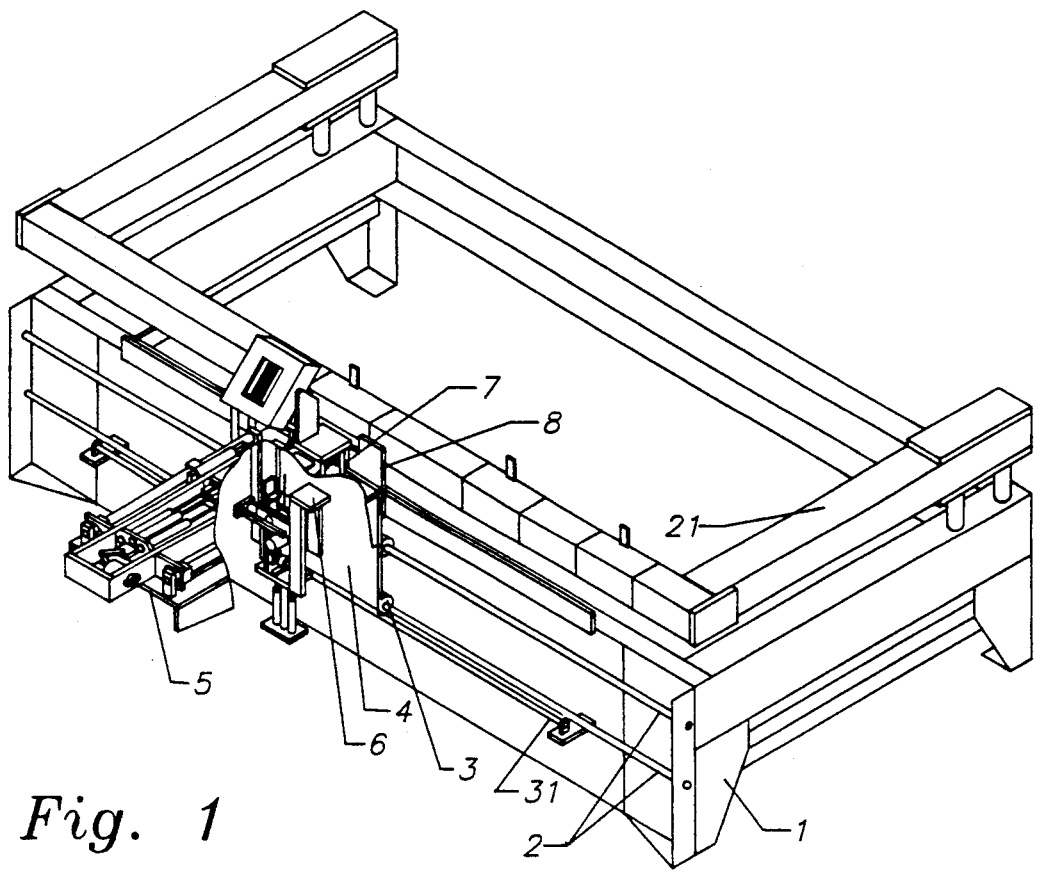
FIG. 1 is a perspective view of the machine frame structure showing a main carriage with the mechanisms of screwdriving, screw feeding, and hinge feeding.
Figure 2A:
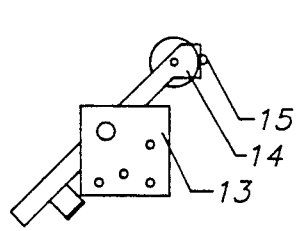
FIG. 2A is an enlarged view of a fragmentary portion of FIG. 2 showing a first door stopping device.
Figure 2B:
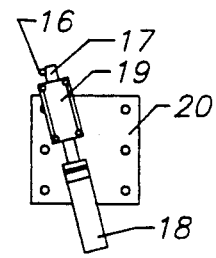
FIG. 2B is an enlarged view of a fragmentary portion of FIG. 2 showing a second door stopping device.
Figure 2:
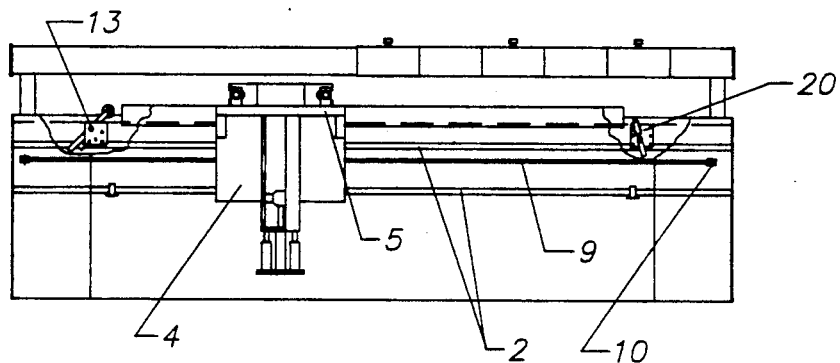
FIG. 2 is a front view of frame structure of FIG. 1.
Figure 3:
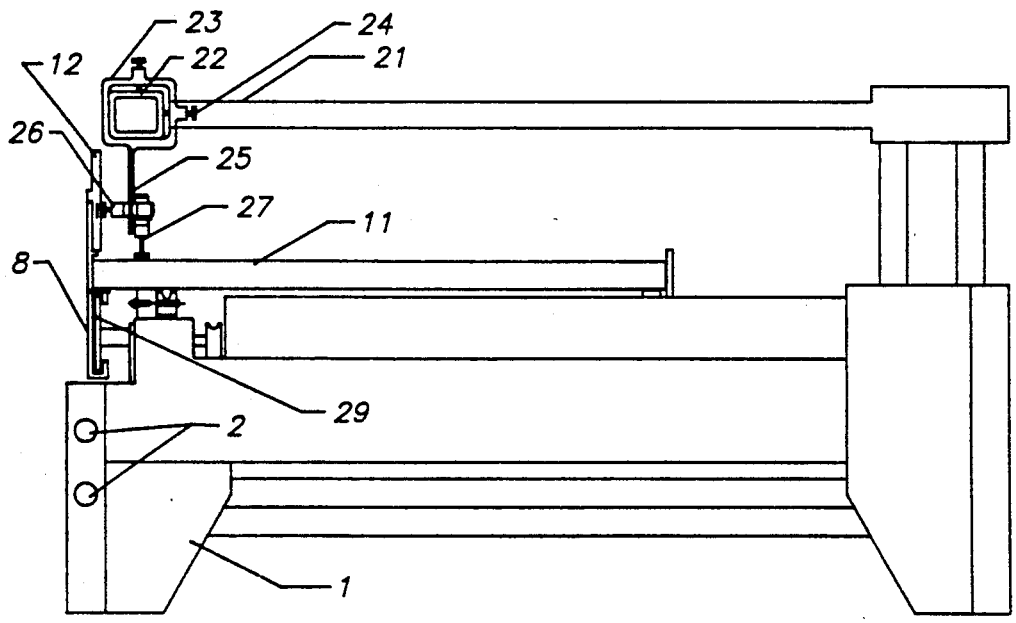
FIG. 3 is a side view of machine frame structure.
Figure 4:
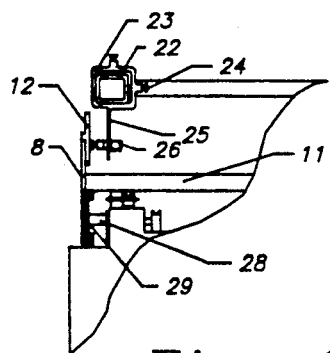
FIG. 4 is a partial side view jamb clamping system.
Figure 5:
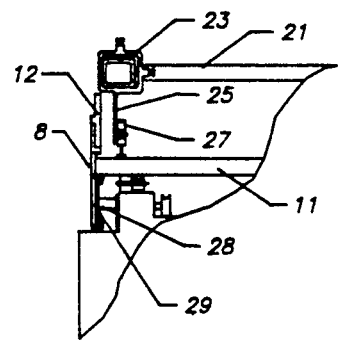
FIG. 5 is a partial side view of the door clamping system.
Figure 6:
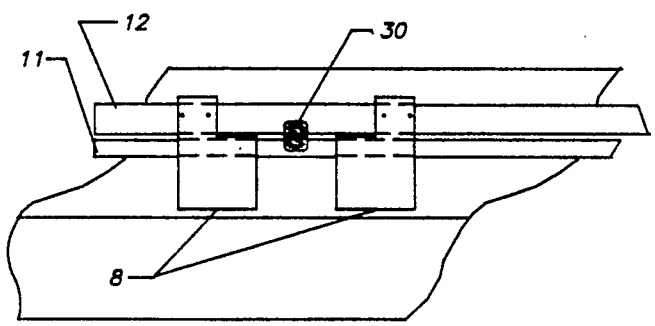
FIG. 6 is a partial front view of the frame structure supporting upstanding plates that retain the door and jamb showing also the position of hinge placement.
Figure 7:
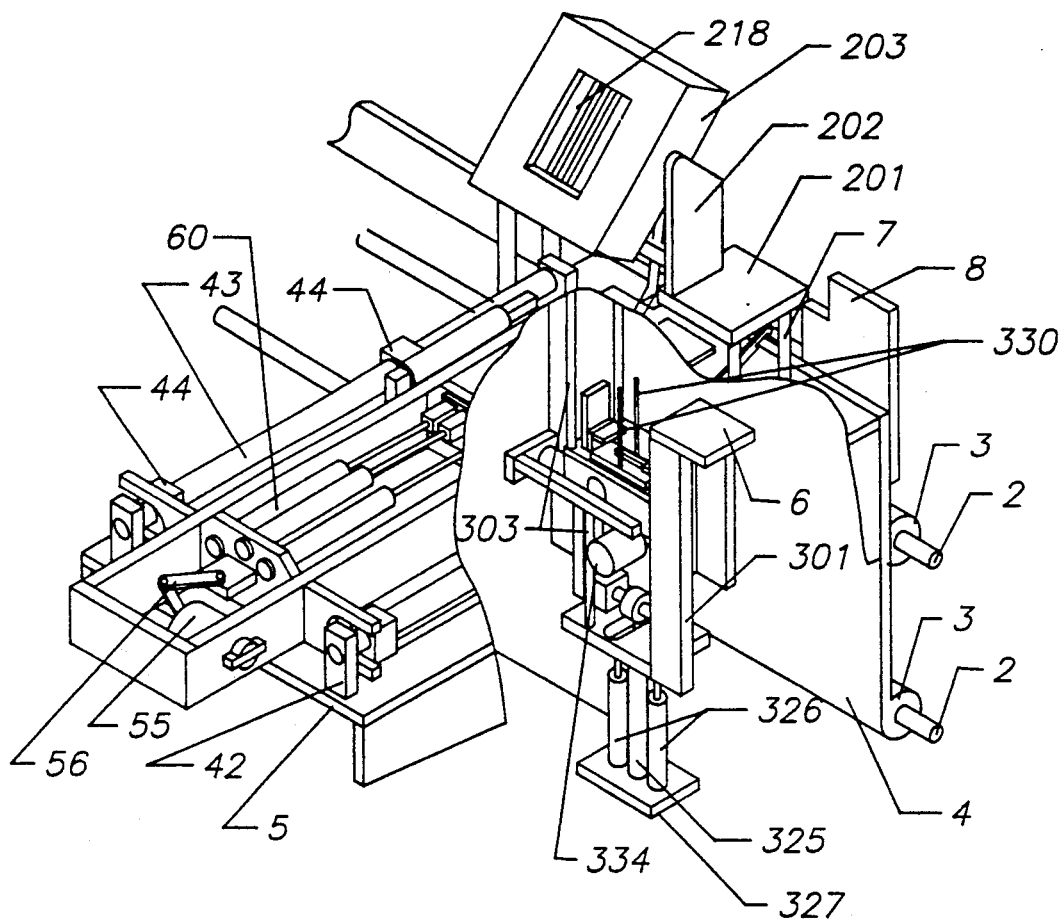
FIG. 7 is a perspective cutaway view of the main carriage with mechanisms of screwdriving, screw feeding, and hinge feeding, and placement.
Figure 9:
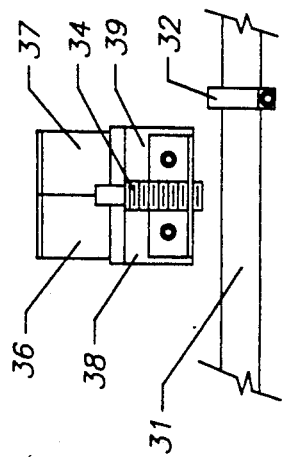
FIG. 9 is a breakout view of the stopping and sensing devices for the main carriage approaching a stop shaft collar.
Figure 10:
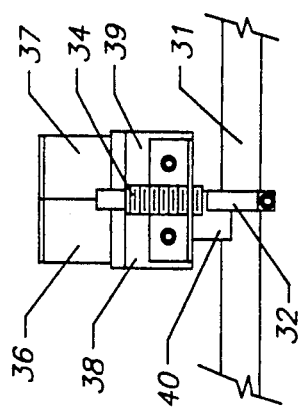
FIG. 10 is a breakout view of the stopping and sensing devices for the main carriage as the trailing stop member abuts the shaft collar.
Figure 11:
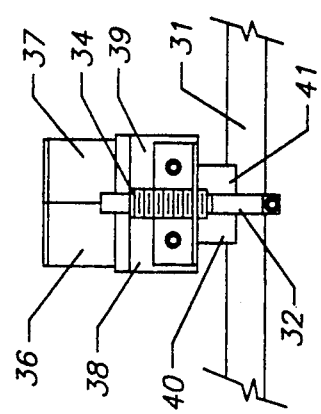
FIG. 11 is a breakout view of the carriage with the leading stop member locking the carriage.
Figure 8:
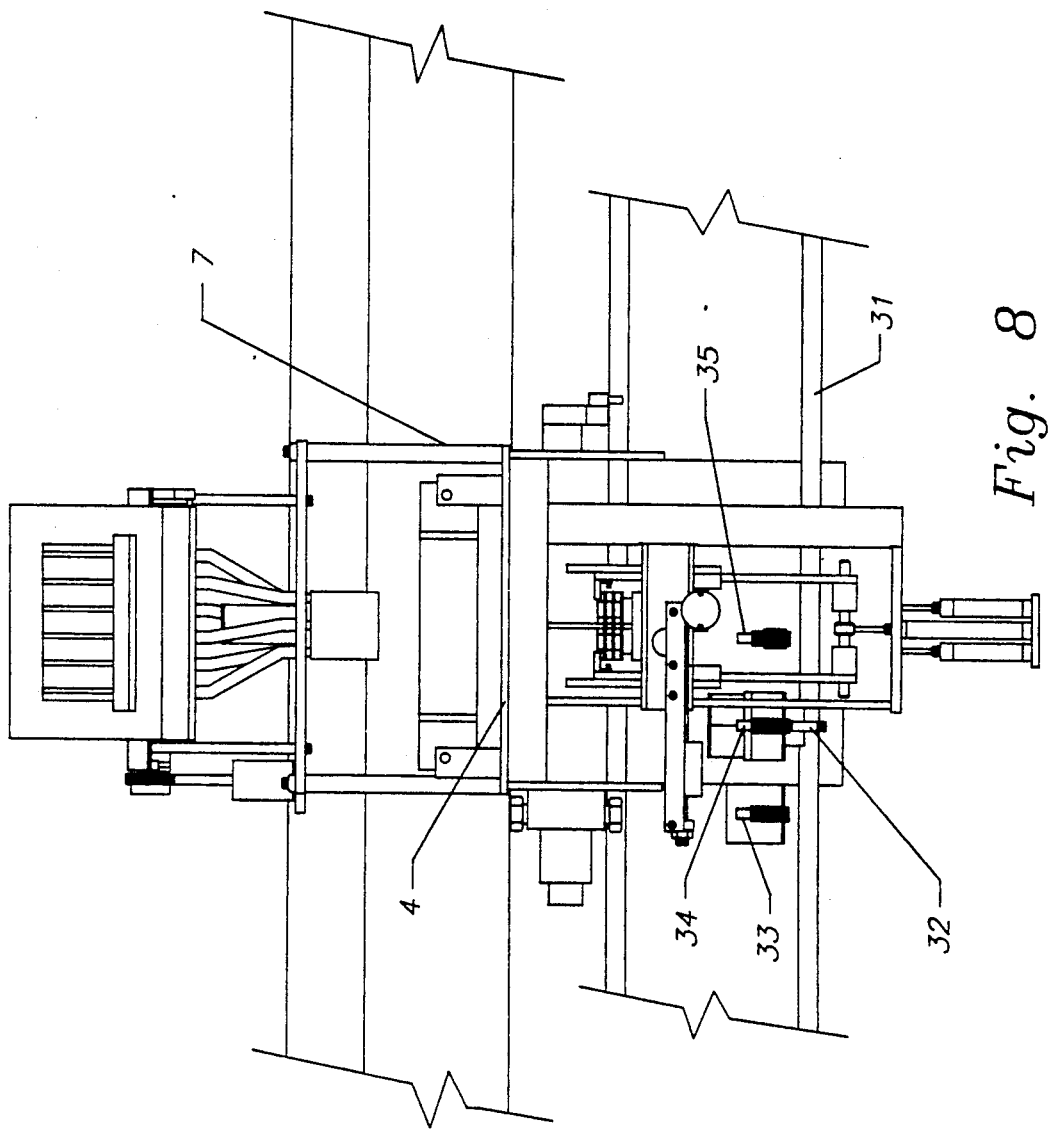
FIG. 8 is a front view of the main carriage showing transverse movement stopping and sensing devices.

Referring to FIGS. 1 through 7, a door 11 and jamb 12 are shown in position and supported on members of basic machine 1 with the door face being horizontally disposed leaving the front door edge in a generally vertical plane. The jamb 12 is positioned against upstanding members 8 with the jamb face being in the same general vertical plane as the door edge. Upstanding members 8 are adjustable horizontally along bar 29 supported by stantions 28. The door is normally slid on to the machine over pivotally mounted stop lever 14 pivoted from plate 13 which is attached to machine frame 1. After the door clears lever 14, it can be manually moved back against the vertical edge of stop lever 14, actuating switch 15. A jamb 12 can then be positioned against a corresponding end stop and held in place by cylinders 26 pressing the jamb against upstanding members 8. If the door is required to be machined in an opposite hand manner, the door can be moved forward against retractable and extendable stop 17 actuated through rectangular housing 19 by cylinder 18. This assembly is attached by plate 20 to machine frame 1 as shown. Either switch 15 or 16 will actuate door clamp cylinders 27. Clamps 27 are fastened to members 25, attached to slideable and rectangularly apertured members 23 over rectangular tube 22 which is attached and supported by upper frame structure 21 and said slideable members can be locked in place by turn screws 24. Two tracks or bearing ways 2 support plate 4 through lineal bearings 3 allowing for transverse motion. Continuous chain 9 is rigidly joined to plate 4 and said chain is diverted around sprockets 10 and driven by a gear motor on the back side of machine. Plate 5 which supports a screwdriver assembly, is fixedly fastened to plate 4 at 90 degrees in a horizontal plane. Stanchions 7 are attached to plate 5 and said stanchion support a screw feeding system. A hinge feeding system is supported by brackets 6 which are fixedly suspended from plate 5. The entire unit consisting substantially of these three elements attached to plate 4 will be designated as the main carriage.

Referring now to FIGS. 8 through 11. With the main carriage moving transversely from left to right, the electric sensors 33, 34, 35 mounted to plate 4 sense adjustable and pre-set collars 32 positioned on shaft 31. In this direction, sensor 35 is activated by collar 32 thereby reducing speed of drive of chain 9 and extending stop 40 by cylinder 36 through aperture housing 38, this assembly being attached to plate 4. As collar 32 is abutted by stop 40, sensor 34 is activated extending stop 41 by cylinder 37 through aperture housing 39 thereby capturing collar from both side surfaces and locking main carriage in place. These preset locations determined by the collar settings coincide with the placement of hinges along the length of the door and jamb.

If opposite transverse main carriage motion is desired, that is right to left, then sensor 33 will replace sensor 35 in the circuit, thereby activating stop 41 first, then stop 40 to accommodate the correct function of the main carriage transverse locking system.

Figure 12:
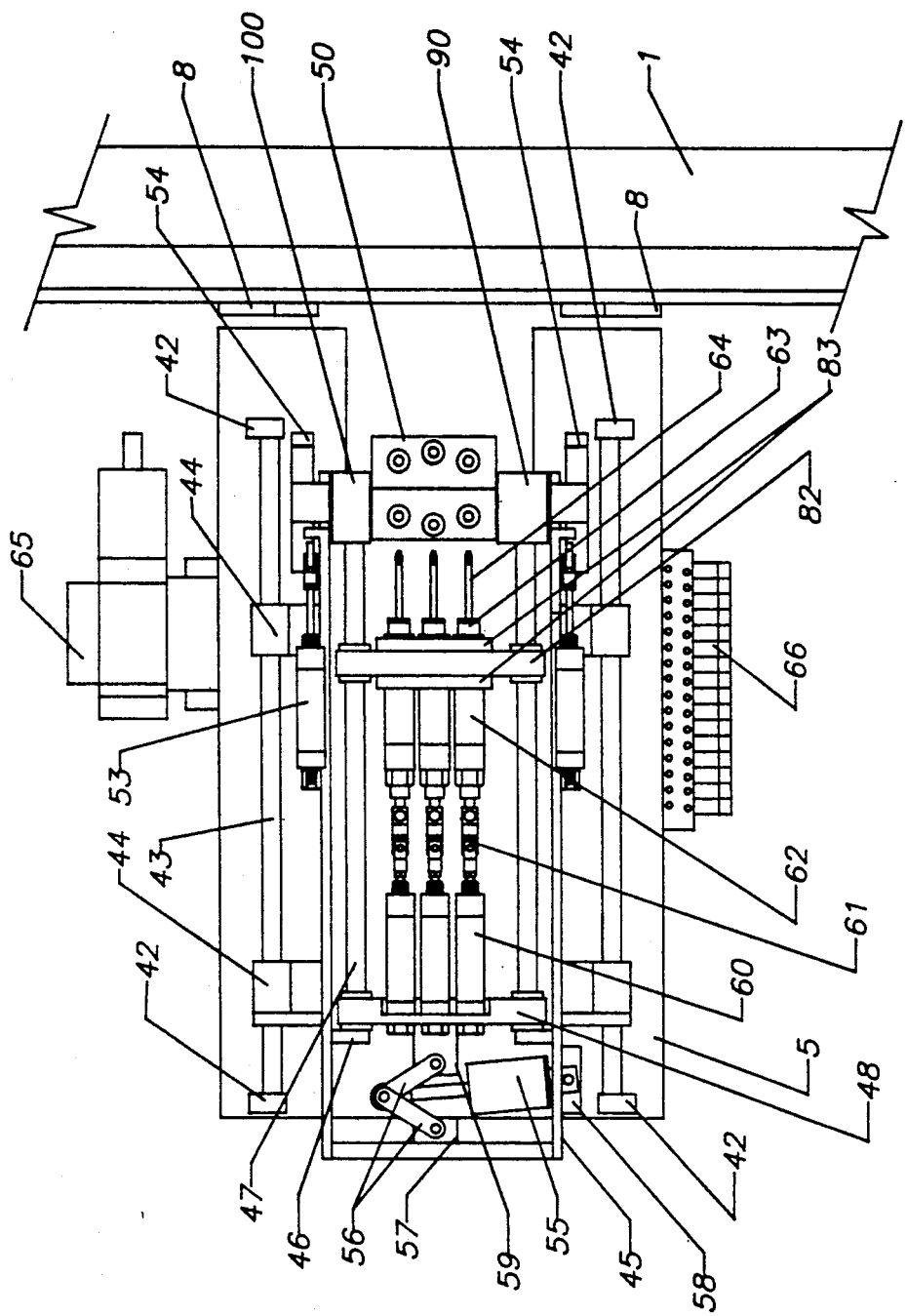
FIG. 12 is a top view of the screw driving apparatus with the screw and hinge receiving block in the horizontal position.
Figure 13:
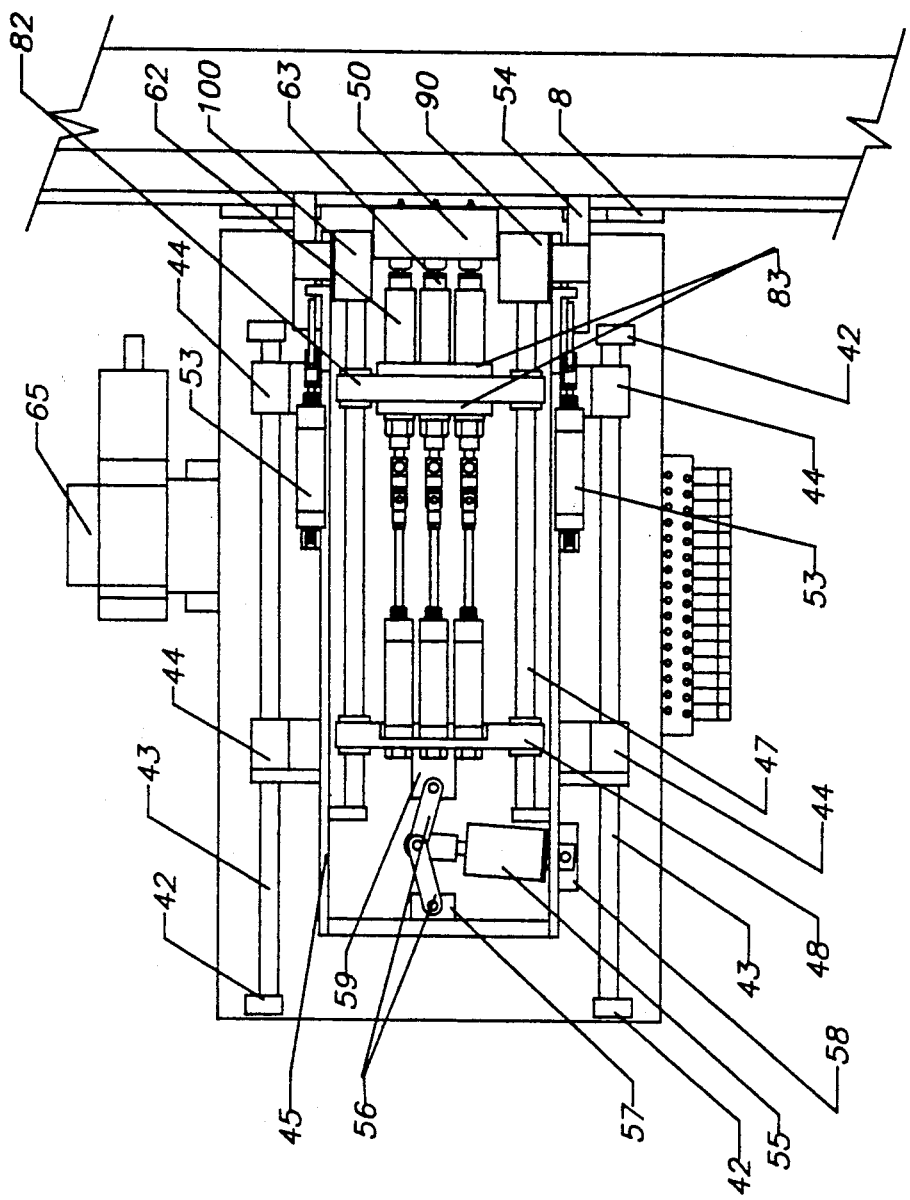
FIG. 13 is a top view of the screw driving apparatus with the screw and hinge receiving block in the vertical position.
Figure 14:
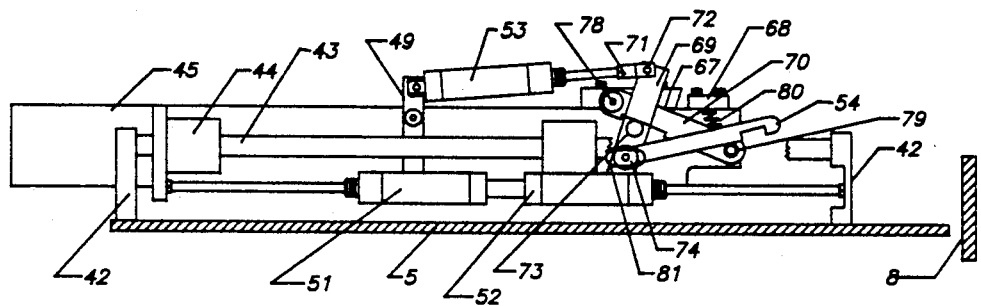
FIG. 14 is a view of the latching mechanism of the second carriage with the latch disengaged.
Figure 15:
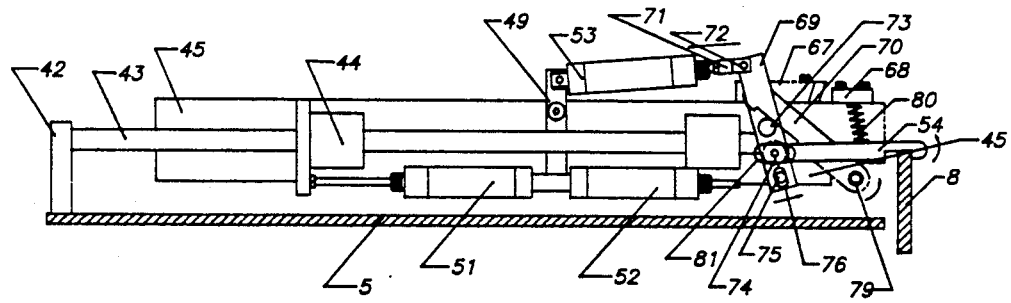
FIG. 15 is a side view of the latching mechanism of the second carriage engaged with the upstanding plate mounted to machine frame structure.
Figure 17:
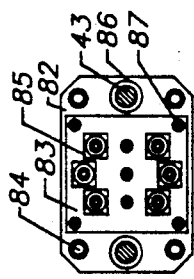
FIG. 17 is a front view (looking into ends of screw driver bits) of the third carriage.

Now referring to FIGS. 12 through 22, a screwdriver system is mounted on plate 5 starting with stanchion blocks 42 supporting shaft ways 43 which in turn support carriage 45 through lineal bearings 44. Screwdriver carriage 45 is activated inwardly toward the jamb face and door edge, and outwardly by cylinders 51 and 52 shown in FIGS. 14 and 15. Carriage 45 is in the full outward position with these cylinders extended, full inward position with them retracted, and in an intermediate position with one extended and one retracted. These positions are used for convenient feeding or placement of hinges and screws and for applying the hinges to the work pieces. In the full inward position of carriage 45, the mechanisms of FIGS. 14 and 15 are utilized. Air cylinders 53 pivoted from brackets 49 actuate arms 54 over upstanding plates 8 and these arms impart by indirect lever action, both a downward holding motion and an inward tightening motion of carriage 45. The clevices 71 of cylinders 53 are connected to lever members 69 through pins 72. Members 69 are pivotally mounted and retained in elongated slots 76 by pins 75 secured in frame 45. Roller pins 73 in members 69 impart pivotal motion to members 70. Members 70 are pivoted from pins 78 attached to blocks 67 with the opposite ends of said members having roller pins interacting with arms 54. Arms 54 are both pivotally and slideably connected to frame 45 by pivotal blocks 74 fitted in slots 81 of frame 45. Arm 54 is held against pins 79 by compression springs 80 projecting from blocks 68.

Figure 18:
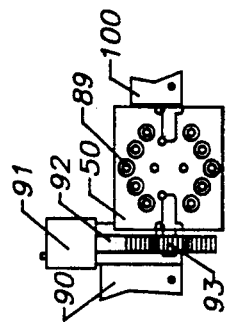
FIG. 18 is a front view of screw and hinge receiving block disposed vertically.
Figure 19:
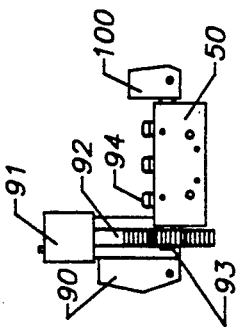
FIG. 19 is a front view of the screw and hinge receiving block positioned horizontally.
Figure 16:
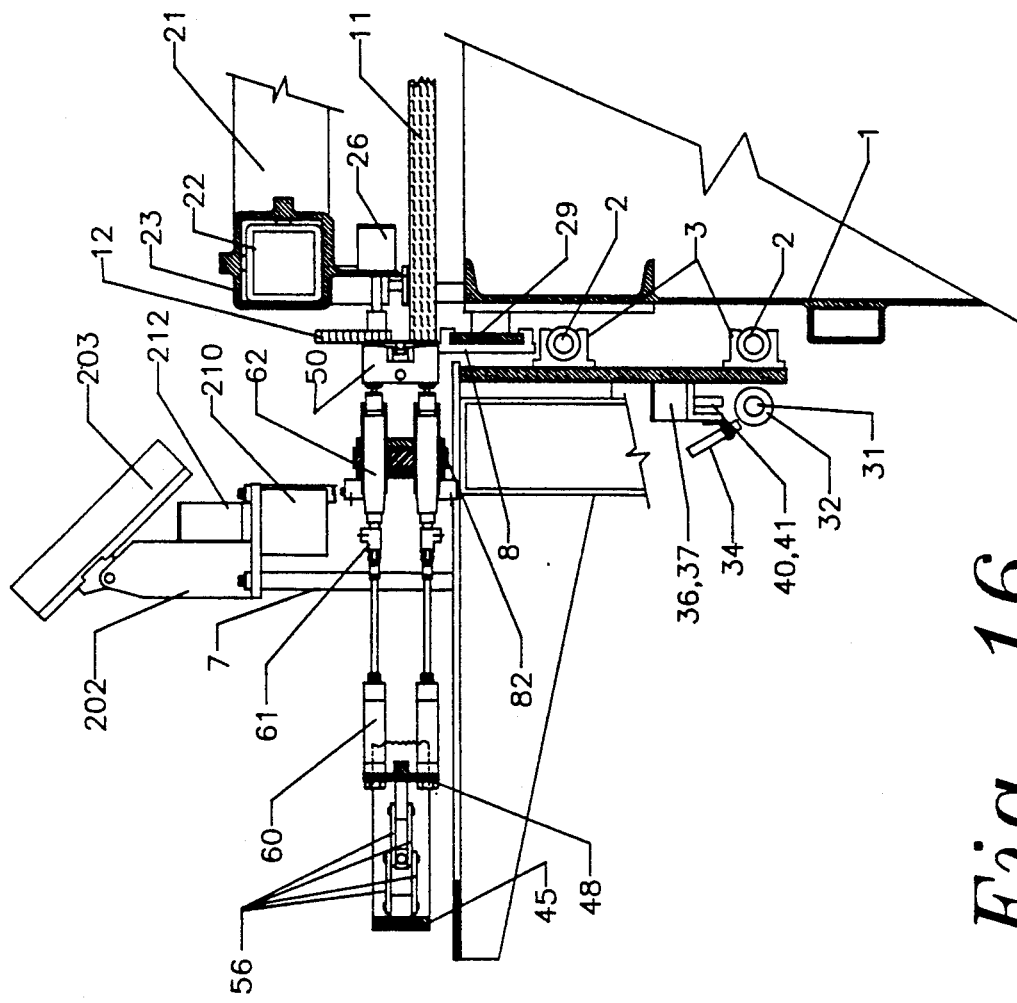
FIG. 16 is a sectional side view of the main carriage with hinge being attached to door edge and jamb face.
Figure 25:
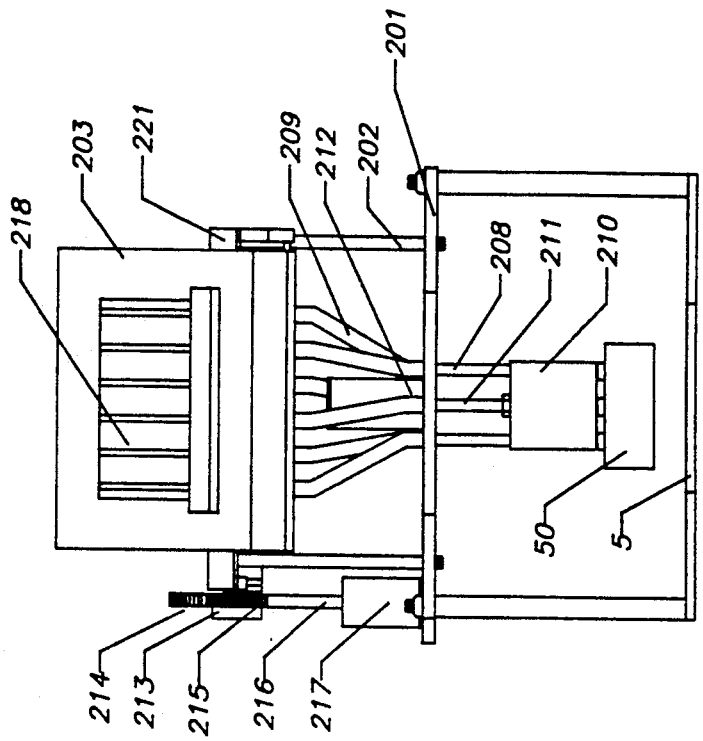
FIG. 25 is a face view of screw box container with screw transport tube, telescopic tube block extension, and screw and hinge receiving block.
Figure 24:
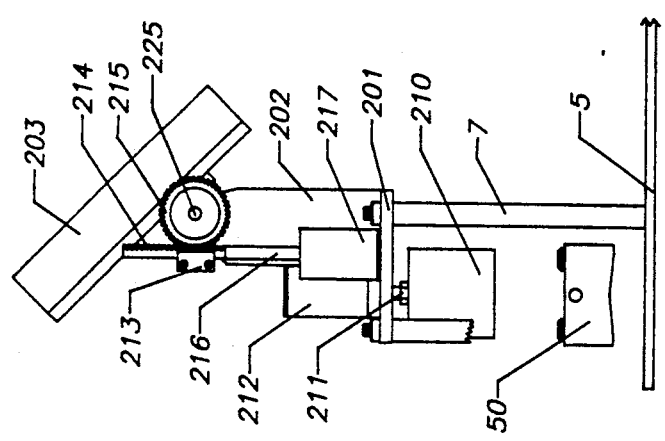
FIG. 24 is a side view of screw box container showing telescopic tube block extension and screw and hinge receiving block.
Figure 23:
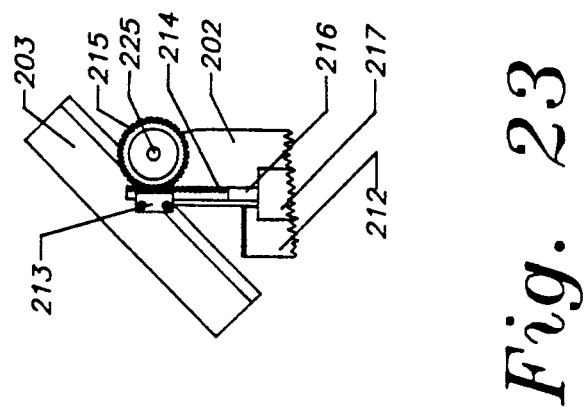
FIG. 23 is a partial side view of screw box container with gear and rack movement device.
Figure 26:
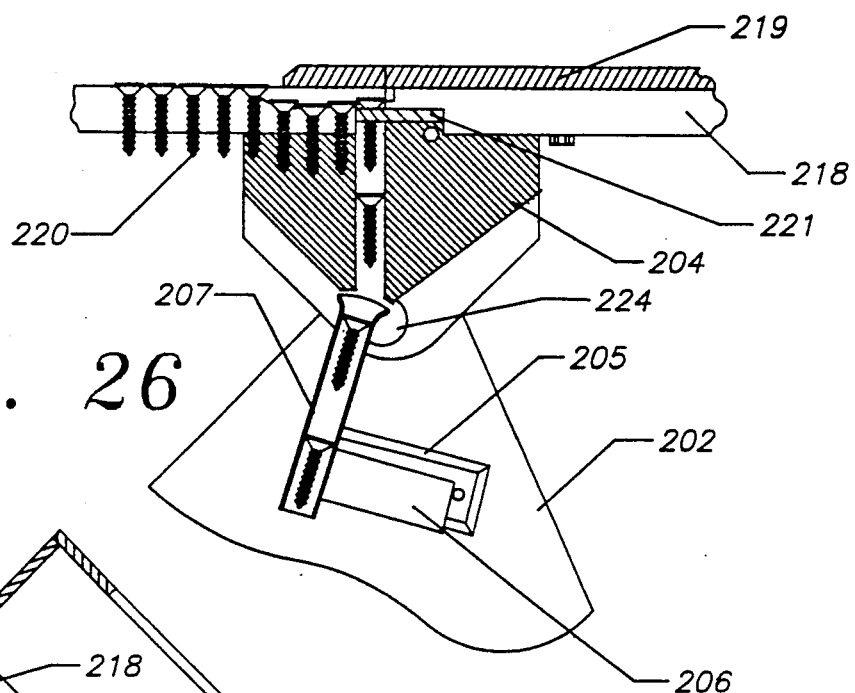
FIG. 26 is a sectional view of lower plate and pivot block of screw box container.
Figure 27:
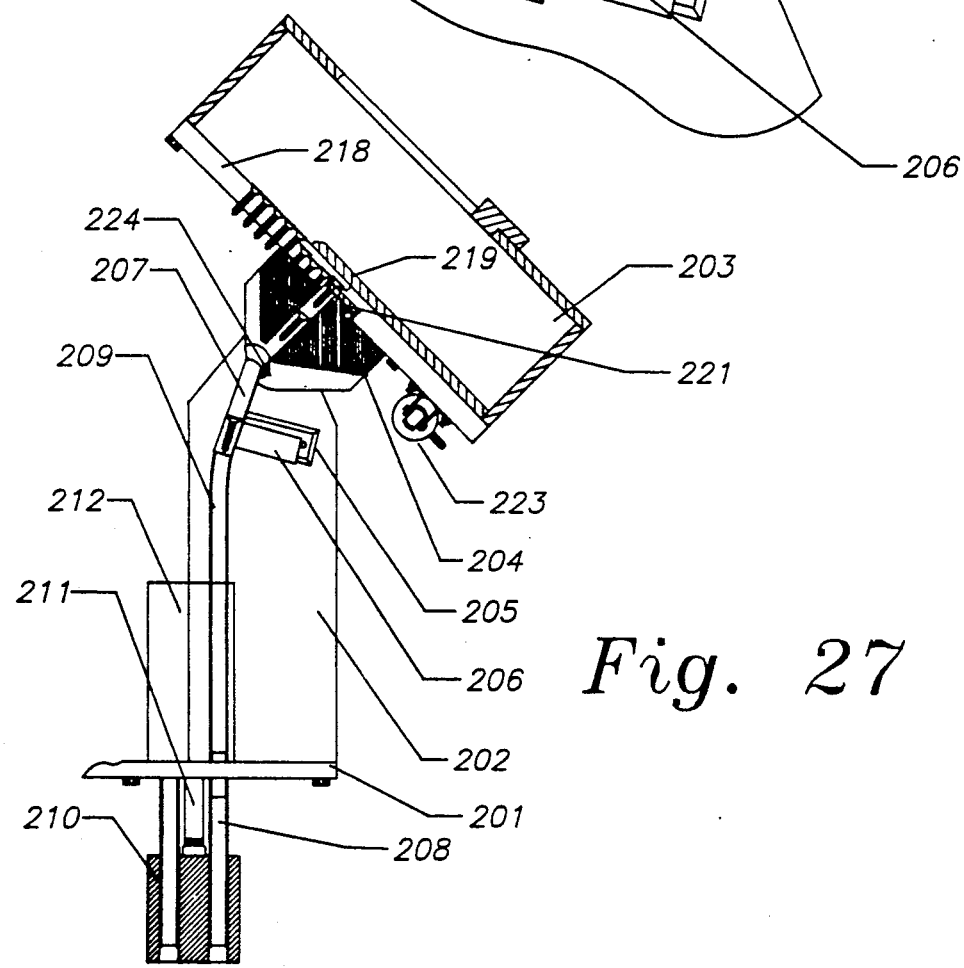
FIG. 27 is a sectional view of screw box container with escapement bar.

Referring to FIGS. 12 and 13, a screw and hinge receiving block 50 with contiguous parts are rotatably mounted between support blocks 90 and 100. Referring more specifically to FIGS. 18 and 19 and 22. Said receiving block 50 is rotatably activated by racks 92 and gear 93 through an arc of approximately 90 degrees by cylinder 91 secured to supporting member 90.

Receiving block 50, when horizontally disposed such as shown in FIGS. 19 and 22, is in a position to automatically receive the hinge butt on the underside held in place by magnets 88. In this orientation, also, screws can be inserted from the top through concentric sleeves 94. Block 50, when in the vertically disposed plane, allows for manual hinge placement to block 50 as well as the fastening of the hinge in correct position with screws being driven in to hold hinge firmly to jamb surface 12 and door edge 11. Referring to FIG. 22, block 50 houses generally 6 cylindrical indentations 89 or recesses coinciding with the screw holes in hinge butts. Steel rings or washers 99 and 97 with rubber flexible rings 98 are placed against hole shoulders. Then pairs of tapered, half circle shells or collets 96 are retained concentrically by said rings and with compression springs 95 and concentric sleeves 94 are retained from the top surface flanges of said shells. Magnets 88 are fixed in recesses to hold hinges to angular surface of block 50. Note that screws dropped through apertures in concentric sleeves 94 will lodge concentrically in shells 96. When rotating screw driver bits are inserted through sleeves 94, they will engage screw heads and drive screws into work pieces. The screws will exit block 50 by the action of the split shells pivoting open to allow the screw heads to pass through.

Referring to FIGS. 12, 13, 20, and 16, air cylinder 55 is attached to frame 45 by bracket 58 from which cylinder body is pivotally mounted. Rod of cylinder 55 is fitted with a pivot block, pivotally supporting pairs of scissor levers 56, one side of the pair being pinned rotatably from bracket 57 and the other side of the pair of lever members being pivotally mounted to bracket 59 attached to inner carriage member 48.

Inner carriage member 48 is rigidly fastened by stud rods 84 with nuts to front screwdriver aperture holding plate 82. See FIG. 17. Plate 82 is abutted on both sides by bronze plates 83, attached by screws 87 having internal squarely apertured wearing surfaces, corresponding on centers, to the holes in the butt hinges being utilized. Lineal bearings 86 are bored into both plate 82 and 48 and ride in shafts 47 supported by brackets 46 attached to screwdriver frame 45. This bearing system allows movement of the inner carriage, as a unit, to be moved inward toward the work pieces and outward actuated by cylinder 55. In the fully extended position of scissor levers 56, the alignment is such that the extended lever arms can withstand a great force exerted by the six screwdriver cylinders 60. Cylinders 60 are secured to rear inner carriage plate 48 from the cylinder body ends. The alignment of cylinders 60, the individual screwdriver motors 62, the screwdriver bits 64, and the squarely apertured openings all coincide with the spacement of screw holes in the hinges with leaf flaps extended. T shaped fittings 61 are used to connect the piston rods of cylinders 60 with the concentrically threaded orifices of the air motors 62. The third position of the T fittings are used as the power air inlets coming from large valve 65. Internal air circuitry of the air motors allows for initial reverse motion of screwdriver bits 64 held by screwdriver chucks 63.

In operation, this reverse feature helps seat the screws correctly before they are finally driven into place. The outer steel shells or housings 85 (FIG. 17) of the screwdriver motors 62 are square in cross section and are slideable in the square aperture of plates 82 and 83. The square construction of the screw motor housings 85, slideable within the square apertures of plates 82, 83, counteract the torque developed by the screwdriver bits.

The sequence of operation is generally governed by electrically operated air valves 66 (FIG. 12) controlled by programmable controllers and imputs such as limit switches and sensors. With the door 11 and jamb 12 clamped in place, and the main carriage locked in position as previously described and with collective elements including the screwdriver carriage frame 45, the inner carriage consisting in part of members 48, 82 and 84, and the screwdriver motors 62 all initially in the full outward position, then the following sequence can transpire:

With screw and hinge receiving block 50 being horizontally disposed, the operator drops 6 screws through sleeves 94 so they lodge in split shells 96 (FIG. 22) of screw receiving block 50. Screw block 50 (FIGS. 12, 13, 17, 18) is rotated 90 degrees to a vertically disposed plane where the operator places hinge on face of block held in place by magnets. Cylinder 55 is then retracted moving inner carriage, consisting in part of items 48, 82, and 84, inward so that screwdriver bits 64 approach the back side of screw block 50 thereby restraining screws from retracting from the back side of block 50. Cylinders 53 (FIGS. 14, 15) moves latch arms 54 over plates 8 securing screwdriver carriage 45 so that vertically disposed screw block 50 with hinge 30 (FIG. 6) pressed against work pieces in pre-machined hinge pockets is firmly in place. After cylinders 60 are activated, with screwdriver motors 62 rotating in reverse, the screw locations are in effect predrilled to about $\frac{1}{8}''$ in depth by the reverse rotation of the screws. With this action being only momentary, the screwdriver rotation is changed to the normal mode and the screws are driven in place. The individually cylinder 60 activated screwdriver motors 62 allow each screw to be driven in completely since they each can be torqued to a certain preset stress.

Because each screwdriver is provided with its independent driving force (cylinder 60), in the event one or more screws jam as they are being driven, the remainder of the screwdrivers will continue to operate to drive their respective screws. Since each air cylinder 60 applies an independent yieldable force, a screwdriver bit of an affected screwdriver will simply rest against the jammed screw during completion of screwdriving of the other screws. With this system it is only necessary to deal with the jammed screw by hand. In an alternative embodiment (not illustrated), the driving force of each screwdriver may be made yieldable by interposing a compression spring, preferably a coil spring, behind the screw bit, e.g. between the bit and the screwdriver shaft, which is stiff enough to normally transmit forward thrust of the screwdriver to drive the screw but which will compress in the event the screw jams. In this embodiment, instead of providing an independent driving force for each screwdriver, air cylinders 60 may be omitted and each screwdriver directly fixed to member 48 of the screwdriver inner carriage. The inner screwdriver carriage would then be designed to be driven forward beyond its engaged position with screwdriver bits in screw block 50, as by interposing an air cylinder between scissors levers 56 and the inner carriage, thus providing a common driving force for the screwdrivers. As the screwdrivers are thus made individually yieldable, in the event of a screw jam the screwdriver inner carriage can continue its forward motion so that the remaining screws are completely driven.

After the screws are driven in, the individual screwdriver motors 62, the inner carriage, consisting in part of members 48, 82, 84, and the outer screwdriver carriage 45 are all moved outward to the starting position. The main transverse carriage of plate 4 can then be automatically moved to the next hinge location and the cycle repeated.

Referring to FIGS. 20, 21, and 23 through 31B. In place of feeding screws by hand as described, this function can be done automatically by various commercially available screwfeeding devices or more adaptably by the screw feeding system hereinafter described.

Plate 201 is mounted on stanchions 7 with upstanding brackets 202 mounted vertically on plate 201. Screw hopper box 203 is pivotally mounted to brackets 202 through screw escapement block 204 attached to bottom plate 218 of box 203, through round shaft, 225 and journals 224. Referring the FIG. 23, 24 and 25, box 203 is pivoted and actuated reciprocally by cylinder 217 attached rigidly to plate 201. Gear rack 214 is fastened to the end of cylinder rod 216 and said rack reciprocates through ways 213 with gear 215 meshing said rack. The rotary reciprocating movement of box 203 allows screws to slide from one end of box 203 to other and randomly fall into slots with screws oriented in a generally and collectively heads up position. Referring now to FIGS. 26 through 31B, screws that have entered slots 222 slide down by gravity against escapement bar 221 actuated by cylinder 223 of FIG. 27 allowing screws 220 to be picked off one at a time for each slot and dropped down through screw escapement block 204 into screw receivers 207 held in place fixedly by bar 206 engaged in block plates 205.

Screws that have not entered slots 222 slide over plate 219 and are retained at the downward end of box 203 until the reverse tilting cycle is repeated. Flexible tube 209 is slid tightly over screw receiver 207 and over fixed straight tubes or conduits 208 inserted and held in plate 201.

Extendible block 210 acts as an extension for each of conduits 208 and is actuated vertically by cylinders 212 attached rigidly to plate 201 with cylinder rod 211 secured to extendible block 210. (See FIGS. 20, 21.) With the screw and hinge receiving block 50 in the horizontally disposed position, extendible block 210 moves down and mates block 50 so screws can be inserted into block 50 dropping into split shells 96 (FIG. 22.)

Extendible block 210 is then retracted to allow the completion of the cycle. Referring to FIGS. 26 through 31B, the escapement bar is slideable within bottom plate 218 at 90 degrees to slots 222 in plate 218. These slots are recessed with shoulders so that the screws 220 drop down below plate 219 in advance of escapement bar 221. This allows the excess screws to pass over the escapement bar and come to rest at the lower end of box 203 when said box is in the down position.

In FIGS. 29A and 29B, with the box in the down position, the screwfeeding sequence is in the "on hold" mode, and screws are retained in the box. FIGS. 30A and 30B show the escapement bar 221 moved so that the screw has started toward the "drop" location, while the point of the escapement bar is starting to come between the subject "drop" screw and the second screw behind it. FIGS. 31A and 31B show the screw in the full drop position with the point portion of the escapement bar obstructing the second screw from advancing. The box then pivots to the return position which moves the screws away from the escapement bar 221 allowing it to be shifted back to the starting position and also allowing the screws to return to the opposite end of the box so the process can be ongoing.

Figure 38:
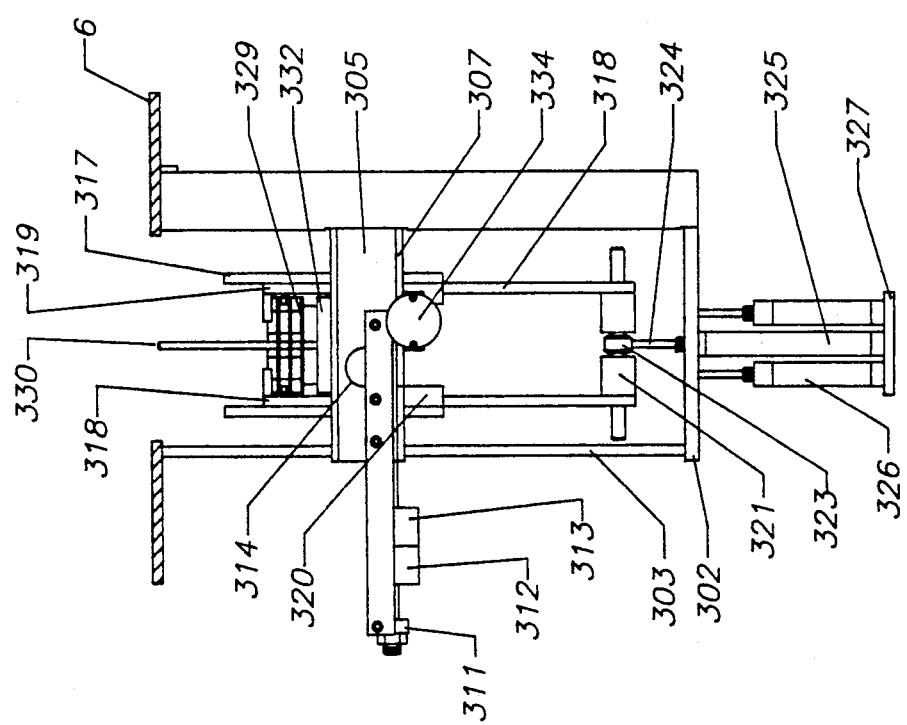
FIG. 38 is a side view of the apparatus for automatic hinge feeding in the hinge pick up mode.

Instead of placing hinges on the magnetic screw and hinge receiving block 50 manually, this function can be done automatically. Brackets 6, fixedly suspending the hinge feeding mechanism hereinafter described, are attached to the underside of plate 5 of the main carriage. The basic concept is to lift one hinge vertically and place it in register on magnetic hinge block 50 as shown in FIGS. 32 and 38. Channel members 301 and round members 303 project downwardly from mounting brackets 6 and support horizontally disposed plate 302. Cylinder rods of air cylinders 326 are secured to plate 302 from the underside and said cylinders are rigidly attached to plate 327 on the cylinder ends. Cylinder 325 is also rigidly attached to plate 327 and said cylinder is extendable through an opening in plate 302. Fixedly attached also to channel member 301 is an assembly housing various mechanisms with side plates 305 and top plates 306 and 307 shown. The top view of this assembly is characterized by a general H configuration (FIGS. 39 through 41) so that upstanding members 317 and 318 can project through said assembly and be movable transversely in and away from the center line of hinge 329.

Upstanding members 318 are vertically slideable through rectangularly apertured housings 320 with back supporting plates 317, said housings being restrained vertically within of the assembly but being slideable in and away from the centerline of hinge 329 placement.

Hardened round rod 322 is held by collar 323 attached to cylinder rod 324 of cylinder 325. Horizontally disposed lineal bearings are housed in blocks 321 which are fixedly attached to upstanding members 318. This construction allows both vertical and transverse movement of upstanding members 318.

The actuating means for transverse movement of housings 320 with back support plates 317 is a gear and rack system actuated by ganged air cylinders 312 and 313 attached one end to members 310 and 311 with adjusting means 337 and on the other end to rack 315. Top gear rack 316 (FIG. 36) attached to left side housing 320 with support back plate 317. Bottom rack 315 is fixedly attached to cylinder 313 rod end and said rack secured to the right side housing 320 and right support plate 317. Gear 314 mesh both racks 316 and 315 producing symmetrical and simultaneous movement of housings 320. In this installation identical pairs of racks are used with connecting bar 309 (FIG. 41) between racks. Cylinder bodies 312 and 313 are ganged in series so that it is possible to locate housings 320 (with supporting plates 317) in three transverse positions. i.e. full out position away from the centerline of the hinge, full in position toward the centerline of the hinge, and an intermediate or middle position. These positions are necessary for the hinge pick up function of the hinge feeding system.

Hinges 329 are loaded in magazines outside the machine area and a magazine with plate 332 (FIGS. 33, 34) is placed over vertically disposed and rotatable shaft 333 with engaging means such as a hex protrusion to mate with magazine hopper plate 332. Spacer bar 331 is attached to plate 332 and two pins 330 extend vertically from plate 332. (See FIGS. 33 and 34). Hinges are loaded in magazine by dropping hinges down so that pins 330 extend through center screw holes of hinges. These hinges generally have pivot or knuckle pins with top and bottom ends. In loading the magazine, hinges are oriented always in the same direction. Means are provided for rotating the magazine 180 degrees for right hand or left hand application of hinges.

Figure 36:
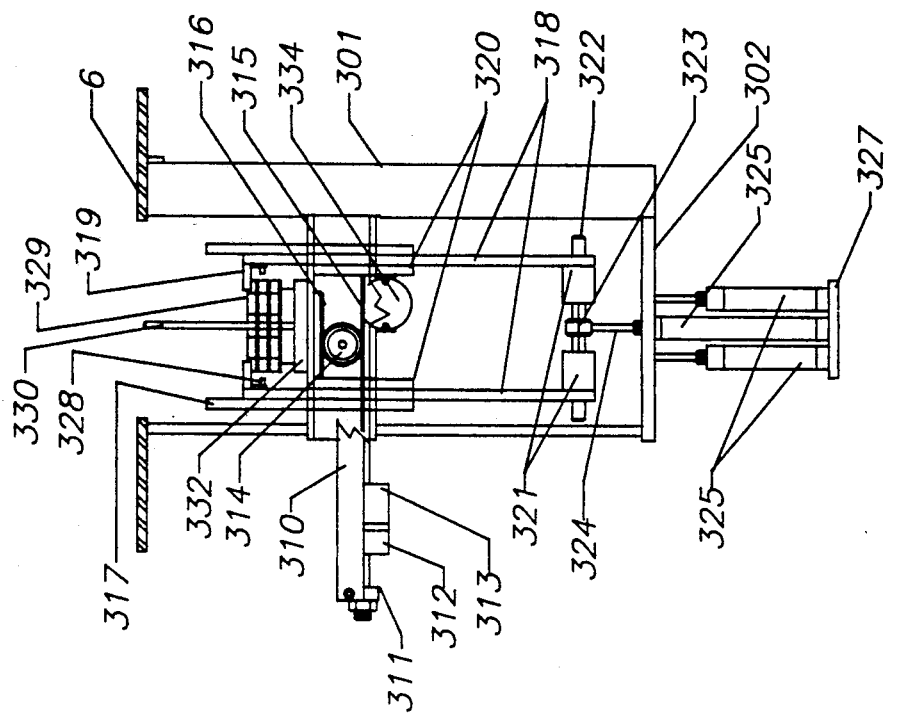
FIG. 36 is a side view of the apparatus for automatic hinge feeding with right angle brackets resting on the top hinge prior to the pick up mode. This view also shows a cutaway view of the gear and rack system for side movement of the bar arms.
Figure 35:
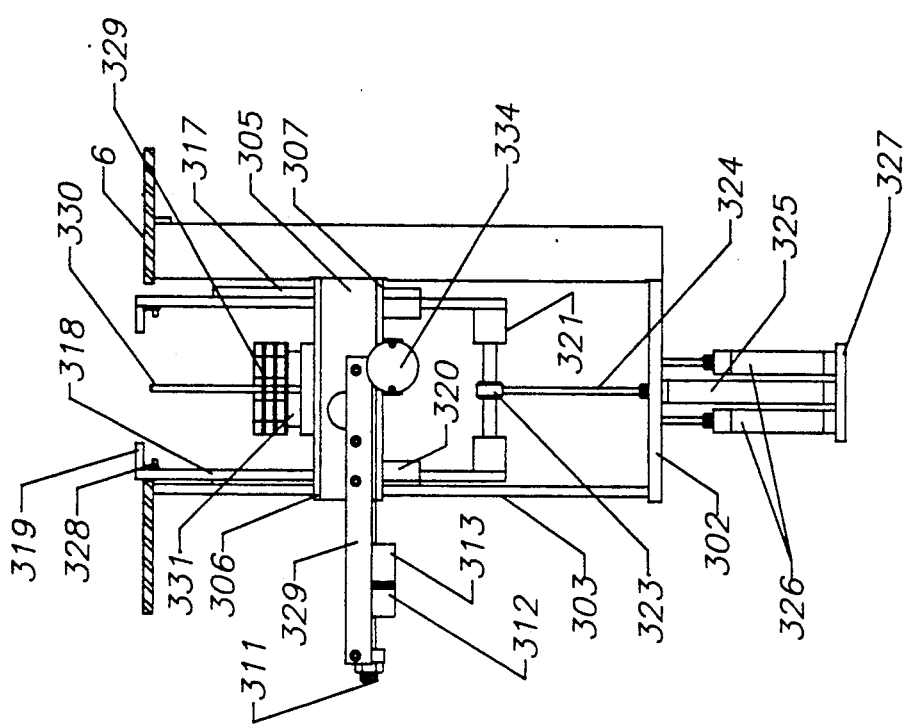
FIG. 35 is a side view of the apparatus for automatic hinge feeding with the mode set for rotating the magazine 180 degrees.
Figure 37:
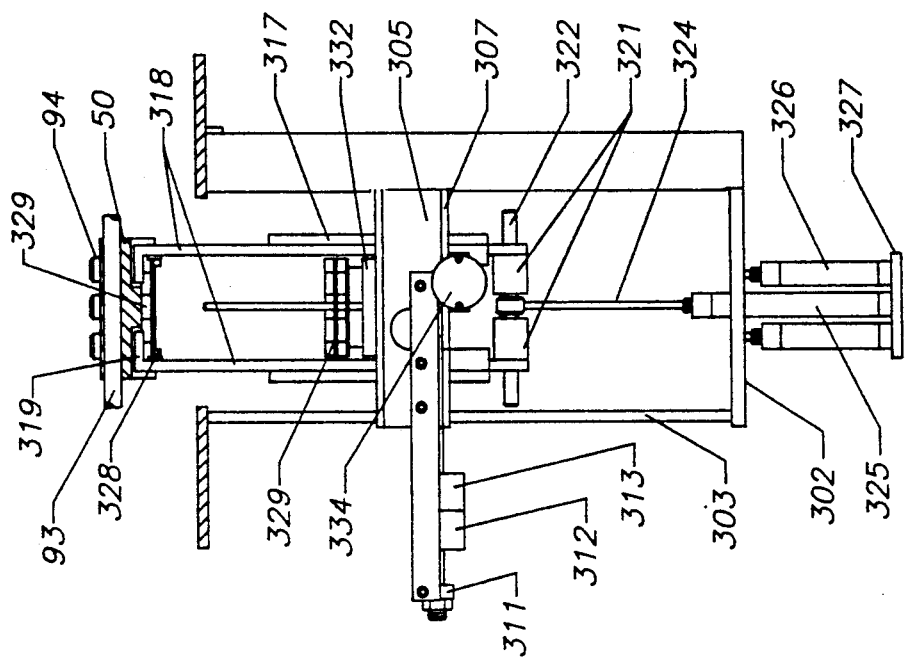
FIG. 37 is a side view of the apparatus for automatic hinge feeding in the hinge pick up mode.

Referring to FIG. 39, rack 335 attached to end of cylinder rod of cylinder 334 actuates gear 336 which drives hex end shaft 333. The magazine consisting in part of plate 332 (FIGS. 33 and 34) mates hex end of 333 and as cylinder 334 is actuated from the full retracted mode to the fully extended mode, said magazine with hinges is rotated 180 degrees thereby orienting the hinge and knuckle pins correctly for right hand or left hand doors. This rotation is done only when plate members 318 are in transversely full out position and fingers 319 are in the intermediate up position, transpiring when cylinders 325, and 326 are fully extended. (FIGS. 35 and 36).

Fingers 319 and pins 328 attached to 318 project inwardly toward the hinge. The sequence of movement follows:

1) The orientation of the hinge is accommodated as described above. Switches 15, 16 (FIG. 2) determine whether cylinder 334 is extended or retracted thereby orienting the hinge for left hand or right hand application.

2) Cylinder 312 remains extended and cylinder 313 retracts thereby placing fingers 319 in an intermediate position, allowing fingers to come down and register on top of hinge 329 without the pins 328 obstructing the downward movement. (See FIGS. 36 and 40.)

3) Both cylinder 312 and cylinder 313 are retracted thereby positioning pins 328 under leaves of the top hinge and this provides lifting means.

4) With hinge and screw receiving block 50 horizontally disposed and in correct location (determined by cylinders 51 and 52) and with upstanding bars 318 with fingers and pins as described in 3), hinge is moved upward and attached to magnetic block 50. (See FIGS. 38 and 41). Note that cylinders 226 are retracted and 225 is extended for maximum travel.

5) After the hinge is placed in the position shown in FIG. 38, cylinders 312 and 313 are extended thereby moving upstanding arms 318 outward and cylinders 326 move said arms downward to an intermediate vertical position. The cycle can then be repeated.

I claim:

1. Apparatus for hingedly connecting an adjacent pair of work members each having elongate hinge leaf receiving surfaces, by butt hinges to be seated on said receiving surfaces comprising:
 (a) means for supporting said work members so that said receiving surfaces are in position for receiving the leaves of a butt hinge,
 (b) a hinge applicator mounted for movement between a hinge applying location adjacent to said hinge leaf receiving surfaces when said work members are in position for receiving hinges and a hinge receiving location, said applicator having
  i. a screw receiving side and a hinge applying side with a plurality of apertures extending therebetween, said apertures being adapted for receiving screws at said screw receiving side and for guiding screws therethrough as they are screwed into said hinge leaf receiving surfaces and
  ii. hinge supporting means associated with said hinge applying side for releasably supporting a hinge positioned with the screw holes of each leaf in alignment with said apertures until the hinge leaves are screwed to said butt-receiving surfaces, (c) means for supplying screws individually to said apertures of said hinge applicator, and (d) a screwdriver unit comprising a gang of screwdrivers, each screwdriver having a rotatable, screwdriver bit, said unit i. being mounted for movement between a retracted position with the screwdriver bits retracted from said hinge applicator and an engaged position with said screwdriver bits engaged in said apertures of the hinge applicator for driving screws therethrough into said hinge leaf receiving surfaces when said hinge applicator is at the hinge applying location, ii. having means for moving said unit between said retracted and hinge applying locations and iii. having means for rotating said screwdriver bits, each screwdriver having means for yieldably urging its respective screwdriver bit forward to screw in a screw and said urging means for each screwdriver being yieldable independent of the urging means for the other screwdrivers, whereby in the event one or more of said screws jam during driving and thereby stop forward movement of the screwdriver bit applied thereto, the remainder of the screwdrivers may continue to urge their respective bits forward to complete their screwdriving.

2. Apparatus as in claim 1 and wherein said yieldable urging means for each respective screwdriver includes a fluid cylinder positioned on the respective screwdriver to urge the respective screwdriver bit forward to screw in a screw and to retract the screwdriver bit on completion of the screwing operation.

3. The apparatus defined in claim 2 and wherein said screwdrivers are mounted together on a carriage for relative movement toward and away from said hinge leaf receiving surfaces to move said screwdrivers between said retracted position and said engaged position.

4. Apparatus as in claim 1 and wherein said yieldable urging means for each respective screwdriver includes a compression spring positioned on the respective screwdriver so as to yieldingly urge the respective screwdriver bit forward to screw in a screw.

5. The apparatus defined in claim 4 and wherein said screwdrivers are mounted together on a carriage for relative movement toward and away from said hinge leaf receiving surfaces to move said screwdrivers between said retracted position and said engaged position and forward of said engaged position towards said hinge leaf receiving surfaces, said carriage having associated means for driving said carriage forward of said engaged position, whereby to urge the screwdriver bits of said screwdrivers forward to screw in the screws.

6. Apparatus as in claim 1 and wherein said means for rotating said screwdriver bits comprises a separate and independently operated fluid motor on each of said screwdrivers.

7. Apparatus for hingedly connecting an adjacent pair of work members each having elongate hinge leaf receiving surfaces, by butt hinges to be seated on said receiving surfaces comprising:

(a) means for supporting said work members so that said receiving surfaces are in position for receiving the leaves of a butt hinge, (b) a hinge applicator mounted for movement between a hinge applying location adjacent to said hinge leaf receiving surfaces when said work members are in position for receiving hinges and a hinge receiving location, said applicator having i. a screw receiving side and a hinge applying side with a plurality of apertures extending therebetween, said apertures being adapted for receiving screws at said screw receiving side and for guiding screws therethrough as they are screwed into said hinge leaf receiving surfaces and ii. hinge supporting means associated with said hinge applying side for releasably supporting a hinge positioned with the screw holes of each leaf in alignment with said apertures until the hinge leaves are screwed to said butt-receiving surfaces, (c) means for supplying screws individually to said apertures of said hinge applicator, and (d) a screwdriver unit comprising a gang of screwdrivers, each screwdriver having a rotatable, screwdriver bit, said unit i. being mounted for movement between a retracted position with the screwdriver bits retracted from said hinge applicator and an engaged position with said screwdriver bits engaged in said apertures of the hinge applicator for driving screws therethrough into said hinge leaf receiving surfaces when said hinge applicator is at the hinge applying location, ii. having means for moving said unit between said retracted and hinge applying locations and iii. having means for rotating said screwdriver bits, each screwdriver having a separate and independently operated air cylinder for urging its respective screwdriver bit forward to screw in a screw.

8. Apparatus as in claim 7 and wherein said means for rotating said screwdriver bits comprises a separate and independently operated fluid motor on each of said screwdrivers.

9. The apparatus defined in claim 8 and wherein said screwdrivers are mounted together on a carriage for relative movement toward and away from said hinge leaf receiving surfaces to move said screwdrivers between said retracted position and said engaged position.

* * * * *